United States Patent [19]

Sakano et al.

[11] Patent Number: 5,526,440
[45] Date of Patent: Jun. 11, 1996

[54] HAND-WRITTEN CHARACTER RECOGNITION APPARATUS

[75] Inventors: Akio Sakano, Ibaraki; Kimiyoshi Yoshida; Masayuki Chatani, both of Kanagawa; Hirofumi Tamori, Tokyo, all of Japan

[73] Assignee: Sony Corporation, Tokyo, Japan

[21] Appl. No.: 619,212

[22] Filed: Nov. 28, 1990

[30] Foreign Application Priority Data

Nov. 30, 1989 [JP] Japan ................................ 1-311321

[51] Int. Cl.$^6$ .......................................................... G06K 9/00
[52] U.S. Cl. ................................. 382/202; 382/187
[58] Field of Search ................................. 382/13, 24, 10, 382/185, 187, 202, 190, 203, 204

[56] References Cited

U.S. PATENT DOCUMENTS 4,326,101  4/1982  Sakoe ................................. 171/15 D
4,764,972  8/1988  Yoshida et al. ......................... 382/13
4,933,977  6/1990  Ohnishi et al. .......................... 382/9

OTHER PUBLICATIONS

Proceedings Tencon 87 IEEE Region 10 Conference, vol. 1, 25–28 Aug. 1987, Seoul, Korea, pp. 91–95; Y. T. Juang: 'On line recognition of handwritten Chinese characters: a syntactic–semantic approach.'

IEEE Micro, vol. 4, No. 5, Oct. 1984, New York, USA, pp. 36–43; W. Doster & R. Oed: 'Word Processing with On–line Script Recognition.'

*Primary Examiner*—Yon J. Couso
*Attorney, Agent, or Firm*—Limbach & Limbach

[57] ABSTRACT

A hand-written character recognition apparatus which checks the relation between the rectangular outline directions of two partial structures of one character.

4 Claims, 5 Drawing Sheets

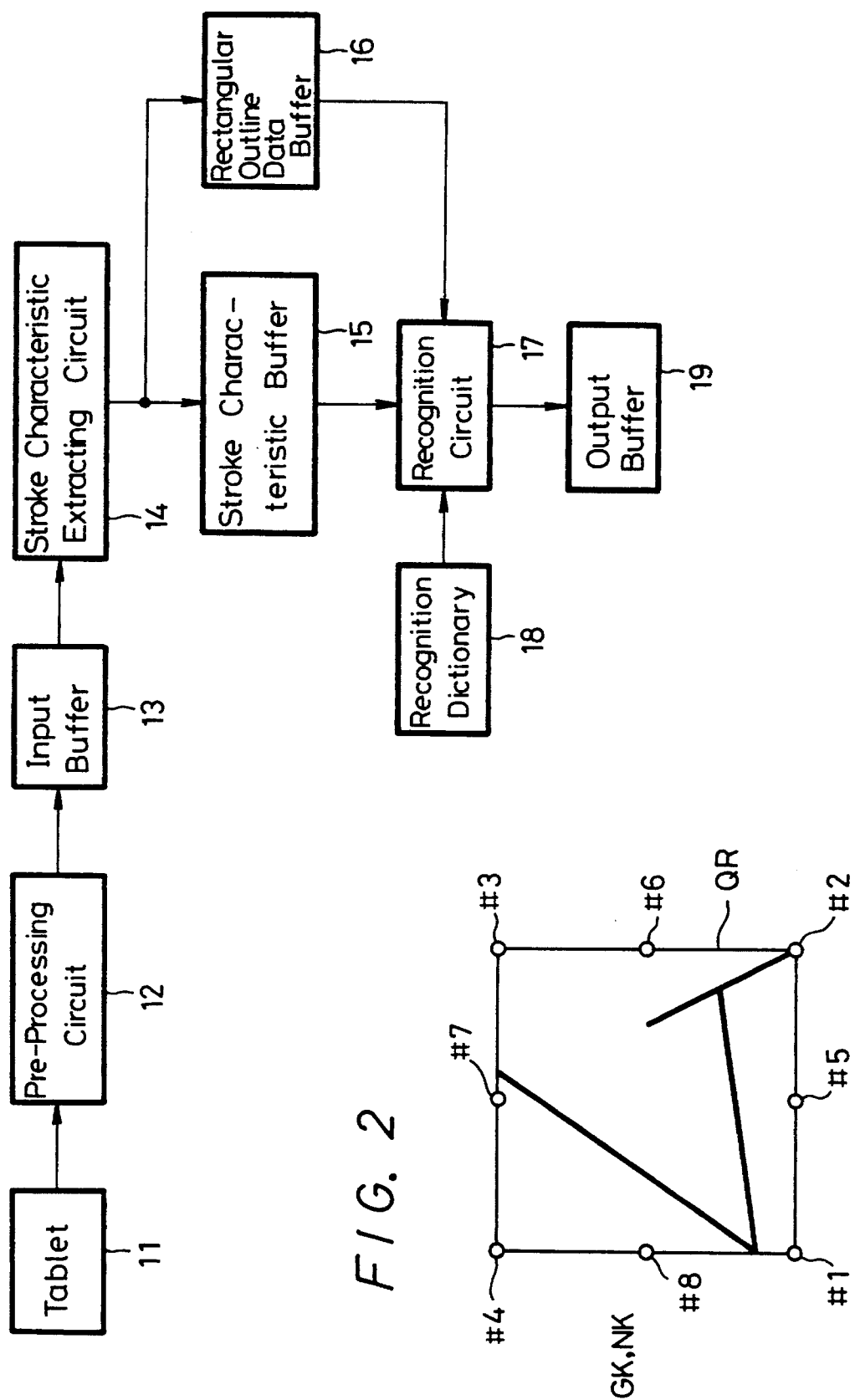

FIG. 3
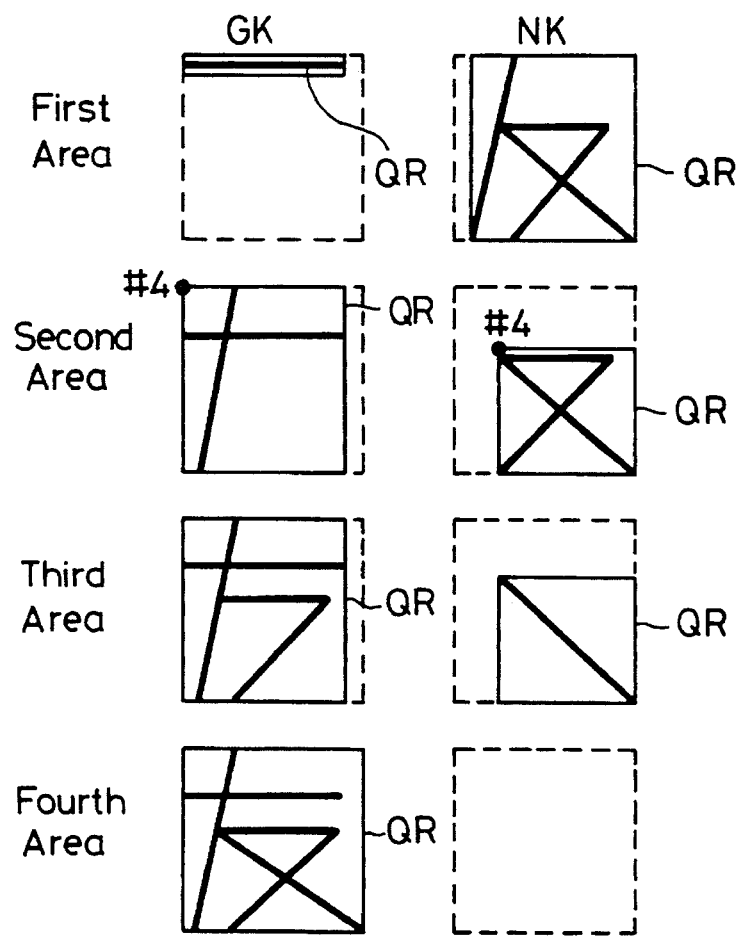
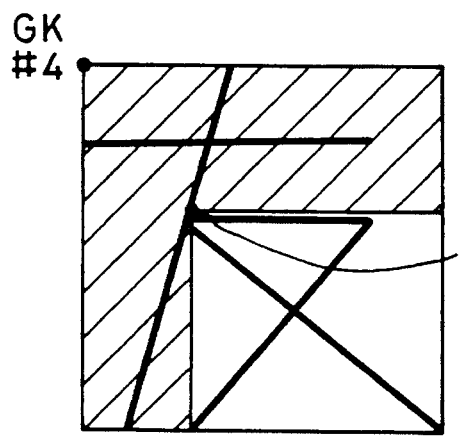
FIG. 4A
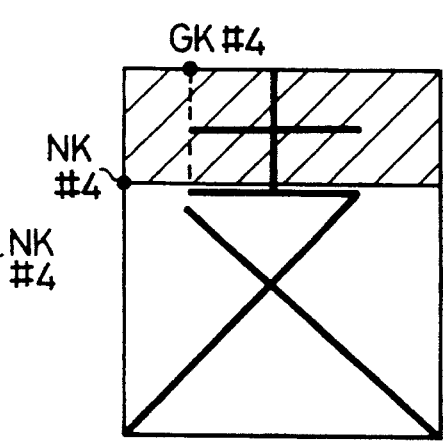
FIG. 4B

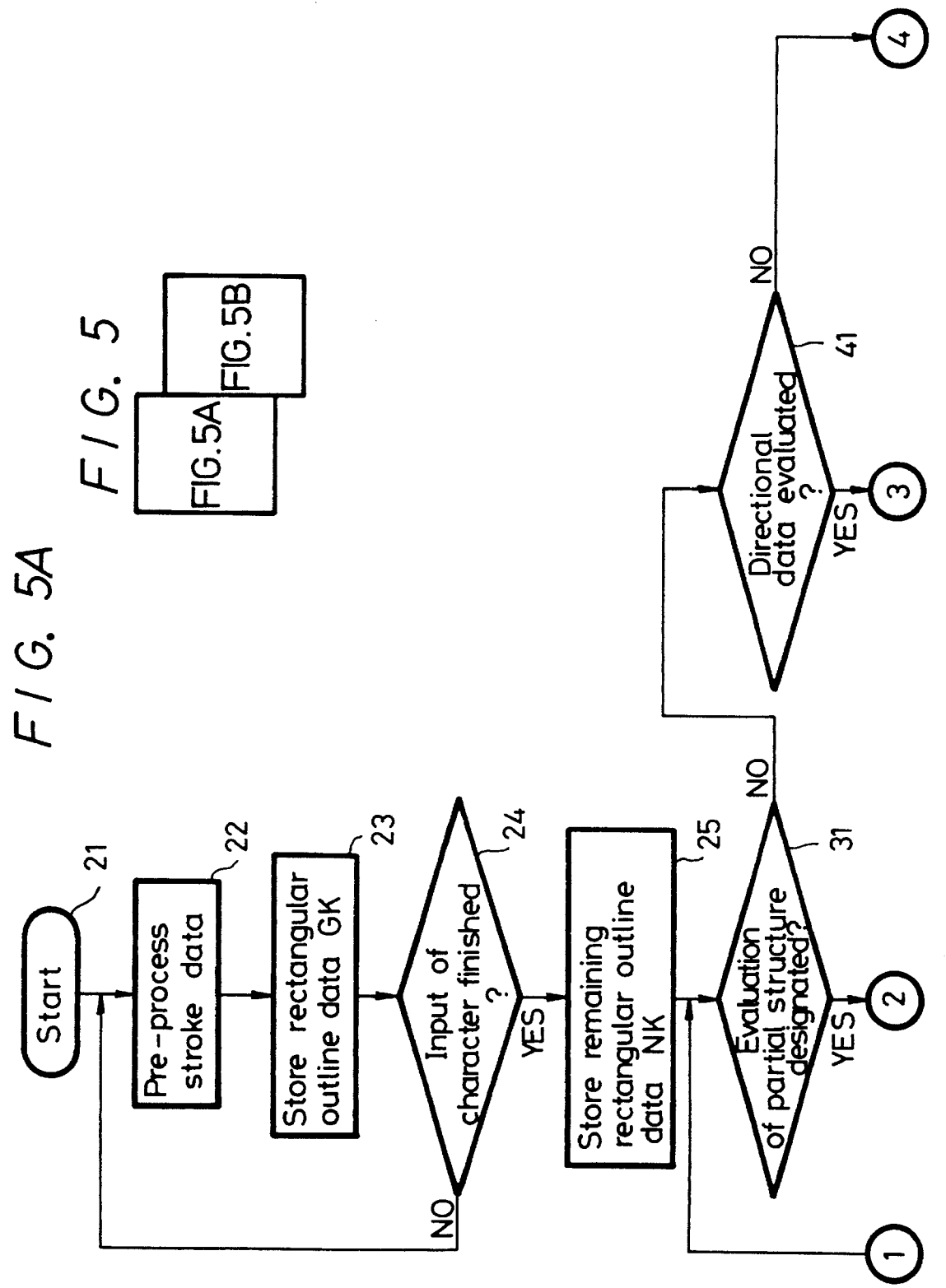

HAND-WRITTEN CHARACTER RECOGNITION APPARATUS

BACKGROUND OF THE INVENTION

1. Field of the Invention

The present invention generally relates to a character recognition apparatus and, more particularly, to a hand-written character recognition apparatus.

2. Description of the Prior Art

Hand-written character recognition apparatus of the on-line type generally execute the following two steps. That is, first step: to extract various characteristics (stroke data) from strokes of a hand-written character manually written on a tablet; and second step: to compare the extracted stroke data with the characteristics (evaluation codes) of characters stored in a character recognition dictionary and output a character code of a character which is sufficiently identical with the evaluation code stored in the dictionary.

When the processing in the second step is carried out, a Japanese Kanji character is decomposed into partial structures such as a left-hand side radical, a right-hand side radical or the like and the character recognition dictionary is formed on the basis of such partial structures. This type of dictionary will be referred to hereinafter as "partial structure dictionary". If the character recognition dictionary is formed such that the parts whose comparison and evaluation are common comprise the partial structure dictionary, the storage capacity of the character recognition dictionary can be reduced.

The writing order of Kanji characters, i.e. the order in which the strokes are written, is not always kept constant and writers often use different writing orders.

Accordingly, a hand-written character recognition apparatus must cope with writers' various different writing orders so that several writing orders must be prepared in the partial structure dictionary to thereby alleviate any restriction on the differences of the writing orders.

However, it is frequently observed that, even when a plurality of writing orders are intended to be prepared in the partial structure dictionary, there is the case that a directional relation of two partial structures of the character can not be evaluated. As a result, the recognition speed of the input character is lowered and interference between characters is increased, thereby reducing the recognition ratio of the character.

OBJECTS AND SUMMARY OF THE INVENTION

Accordingly, it is an object of this invention to provide an improved hand-written character recognition apparatus which can eliminate the aforementioned shortcomings and disadvantages of the prior art.

More specifically, it is another object of the present invention to provide a hand-written character recognition apparatus in which the recognition speed can be increased.

A further object of the present invention is to provide a hand-written character recognition apparatus in which the accurate recognition ratio of the character can be increased.

Yet a further object of the present invention is to provide a hand-written character recognition apparatus in which a hand-written character can be positively recognized regardless of different writing orders of the character.

In accordance with an aspect of the present invention, a hand-written character recognition apparatus is comprised of an input circuit for generating hand-written stroke data, a circuit for deriving and storing characteristics of the hand-written stroke data, a memory for storing rectangular outline data of the hand-written stroke data, a character dictionary memory for storing the characteristics of strokes of characters and directional relations of partial rectangular outline data of characters, and a character recognition circuit for determining characters of the hand-written stroke data by comparing the characteristics and directional relations of partial rectangular outline data of the hand-written stroke data with those stored in the character dictionary memory.

The preceding, and other objects, features and advantages of the present invention will be apparent in the following detailed description of a preferred embodiment to be taken in conjunction with the accompanying drawings, in which like reference numerals are used to identify the same or similar parts in the several views.

BRIEF DESCRIPTION OF THE DRAWINGS

FIG. 1 is a function block diagram showing an overall arrangement of an embodiment of a hand-written character recognition apparatus according to the present invention;

FIG. 2 is a schematic diagram used to explain rectangular outline data of the input character;

FIG. 3 is a schematic diagram used to explain the generation of rectangular outline data and stroke data of the input characters as they are drawn;

FIGS. 4A to 4E, inclusive are schematic diagrams used to explain a directional relation of two partial structures, respectively.

DETAILED DESCRIPTION OF THE PREFERRED EMBODIMENT

Figure 4C:
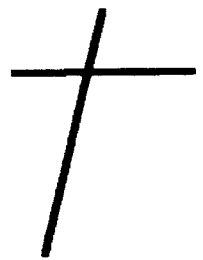

Referring to the drawings in detail, and initially to FIG. 1, when a character is written on a tablet 11, the tablet 11 generates output data. The output data from the tablet 11 is supplied to a pre-processing circuit 12, in which the data undergoes pre-processing such as removal of noise components, polygonal line approximation and the like. The data thus pre-processed is supplied to and stored in an input buffer 13.

A stroke characteristic extracting circuit 14 extracts a stroke characteristic for each stroke of the input character from the data stored in the input buffer 13 and outputs it as stroke data. The stroke data are stored in a stroke characteristic buffer 15 and rectangular outline data GK and NK are stored in a rectangular outline data buffer 16.

Let us now assume a rectangle QR which circumscribes a partial structure as shown, for example, in FIG. 2. Also, points #1 to #8 assume vertexes of rectangle QR, and points #5 to #8 the points of the respective sides thereof as shown in FIG. 2. Then, the rectangular outline data GK and NK will define coordinate data of the points #1 to #8 on the tablet 11.

As illustrated in the left of, for example, FIG. 3 (a fine solid line shows the rectangle QR which circumscribes the partial structure, and a dashed line shows a rectangle which circumscribes a character), the position data #1 to #8 are obtained from rectangles QR by calculation each time the stroke data are added as shown in the left side of FIG. 3 in the case of data GK (even though all of such data #1 to #8 are not shown in the Figure).

The rectangular outline data buffer 16 stores in a first area rectangular outline data GK of a first stroke of stroke data, in a second area rectangular outline data GK of first and second strokes and in a third area rectangular outline data GK of first to third strokes, etc. Thus, the rectangular outline data buffer 16 stores in n areas rectangular outline data GK of the first to n'th strokes.

Further, as shown in the right of FIG. 3, the data NK are generated by reversing the process by which the outline data GK are generated. That is, the data NK are generated by reversing the process by which the outline data GK are generated. That is, the data NK are obtained from rectangles QR each time when stroke data are removed, as shown in the right side of FIG. 3. That is, the rectangular outline data buffer 16 stores in a first area the remaining rectangular outline data NK from which the first stroke of stroke data is removed, in a second area the remaining rectangular outline data NK from which first and second strokes of stroke data are removed, and in a third area the remaining rectangular outline data NK from which the first to third strokes of stroke data are removed, etc. Thus, the rectangular outline data buffer 16 stores in n areas the remaining rectangular outline data NK from which the first to n'th strokes are removed.

In this fashion, with respect to one character written on the tablet 11, the stroke data are generated for each stroke and are sequentially stored in the stroke characteristic buffer 15. Also, the rectangular outline data GK and NK thereof are stored in the rectangular outline data buffer 16.

As shown in FIG. 1, when the data of one character has been stored in the buffers 15 and 16, then a recognition circuit 17 compares the stroke data stored in the buffer 15 by using evaluation codes stored in a recognition dictionary 18.

Various evaluation codes and evaluation methods are prepared and stored in the recognition dictionary 18, and the evaluation of the stroke data is carried out in accordance with these evaluation codes and evaluation methods. The evaluation codes stored in the dictionary at least include stroke information such as length, direction, position, curvature, etc.

The contents of the recognition dictionary 18 concerning the rectangular outline data will now be described. Considering Japanese Kanji characters shown in FIGS. 4A, 4B, 4C, 4D and 4E by way of example, it is to be understood that the character depicted in FIG. 4A is described in a partial structure dictionary of the partial structures depicted in FIGS. 4C and 4D and that the character depicted in FIG. 4B is described in a partial structure dictionary of the partial structures depicted in FIGS. 4E and 4D. The writing orders of the partial structures of the character depicted in FIG. 4A and the character depicted in FIG. 4B are made free.

Figure 4D:
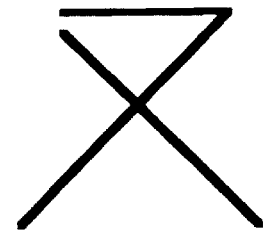
Figure 4E:
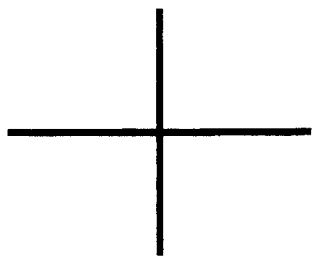

Although the partial structures depicted in FIGS. 4C and 4E cannot be discriminated from each other without difficulty, it is to be noted that the Japanese character shown in FIG. 4A is formed by the combination of the partial structure depicted in FIG. 4C and the partial structure depicted in FIG. 4D located in the lower right direction of the former partial structure, and that the Japanese character depicted in FIG. 4B is formed by the combination of the partial structure depicted in FIG. 4E and the partial structure depicted in FIG. 4D located below. Accordingly, by checking the upper left direction of the partial structure depicted in FIG. 4D from the lower right point of the partial structure depicted in FIG. 4C or the partial structure depicted in FIG. 4E, it is possible to discriminate the Japanese characters depicted in FIG. 4A and FIG. 4B from each other.

Therefore, the recognition dictionary 18 further stores therein a code by which a direction between a certain point #m of points #1 to #8 of a certain partial structure and a certain point #n of points #1 to #8 of the next partial structure is designated.

For example, in the case of FIGS. 4A and 4B, the partial strokes of the partial structure depicted in FIG. 4C and the partial structure depicted in FIG. 4D are examined. In the case of FIGS. 4A and 4B, the directional relation between data #4 of the partial structure depicted in FIG. 4C and data #4 of the partial structure depicted in FIG. 4D is examined.

Referring to FIGS. 3 and 4A, in the second area of the rectangular outline data buffer 16, for the character of FIG. 4A, the data #4 of NK, i.e. the upper right corner of rectangle containing the partial structure depicted in FIG. 4D, is positioned at the lower right of the data #4 of GK, i.e. of the upper left corner of the rectangle containing the partial structure depicted in FIG. 4C.

On the other hand, for the character depicted in FIG. 4B, the data #4 of NK, namely the upper left corner of the rectangle containing the partial structure depicted in FIG. 4D is positioned at the lower left of the data #4 of GK, namely the upper corner of the rectangle containing the partial structure depicted in FIG. 4E. Thus, although the two characters depicted in FIG. 4A and FIG. 4B have similar partial structures, the difficulty of recognition is alleviated by determining the directional relationship between the corresponding rectangular data GK and NK.

When a certain direction between two points is checked by using the rectangular outline data while the recognition dictionary 18 is scanned, the rectangular outline data GK and NK are read out from the rectangular outline data buffer 16 in order to check the direction between the points #m and #n designated in the recognition dictionary 18. In that event, the point #m in the rectangular outline data GK from the rectangular outline buffer 16 is the point on the rectangular outline (partial structure) that is already checked, whereas the point #n is the point on the rectangular outline that is not yet checked. The direction between these points #m and #n is then checked.

When the rectangular outline data and the directional data are checked and recognized results are obtained, the recognized data are generated from the recognition circuit 17 and saved in an output buffer 19.

Figure 5B:
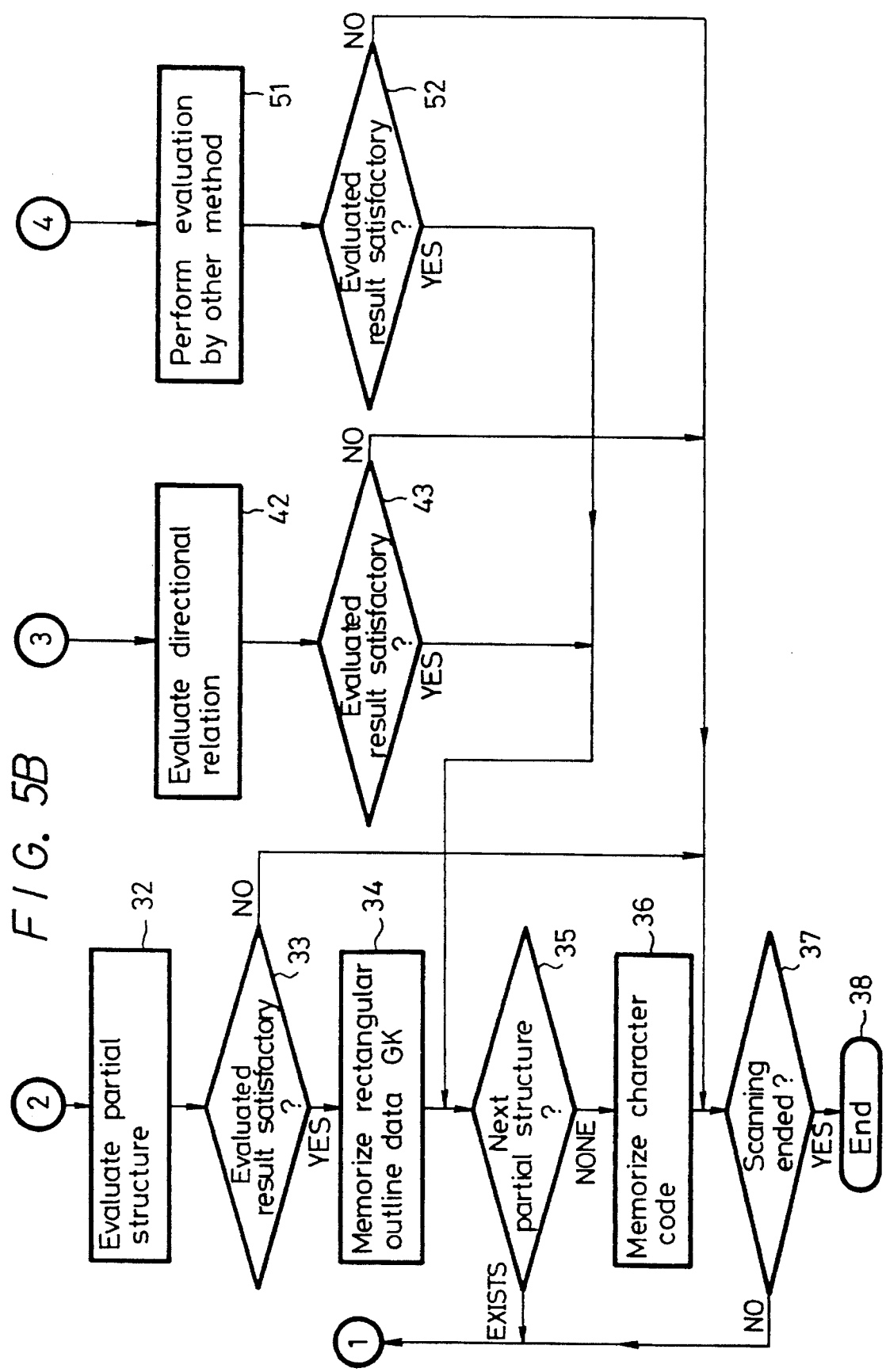
FIG. 5 (formed of FIGS. 5A and 5B drawn on two sheets of drawings to permit the use of a suitably large scale) is a flow chart to which reference will be made in explaining an operation of the hand-written character recognition apparatus of the present invention.

FIG. 5 (formed of FIGS. 5A and 5B) shows an example of a processing routine followed by, for example, a microprocessor (not shown) which makes up some of the elements shown in FIG. 1, in which characters are recognized by utilizing the aforementioned rectangular outline data according to the software program.

Referring to FIG. 5, when the input of a character to the tablet 11 is started, the routine begins with step 21. In step 22, the input data of one stroke is pre-processed and the characteristic of the one stroke is extracted from the one stroke data as stroke data and is stored in the stroke characteristic buffer 15.

In the next step 23, rectangular outline data GK is obtained from the thus extracted stroke data and the rectangular outline data GK is stored in the rectangular outline data buffer 16 at its corresponding area. In step 24, it is determined whether or not the input of the character to the tablet 11 is finished, e.g. writing on the tablet has ceased for a predetermined time period. If a NO is outputted at decision step 24, the routine returns to step 22.

In this way, when a character is written on the tablet 11, stroke data are stored for each stroke in the stroke characteristic buffer 15. As, for example, shown in the left of FIG. 3, rectangular outline data GK are stored at every stroke in the rectangular outline data buffer 16 at each area.

If the input of character data of one character to the tablet 11 is finished as represented by a YES at decision step 24, then the routine proceeds from step 24 to step 25. In step 25, by utilizing the stroke data stored in the stroke characteristic data buffer 15, the remaining rectangular outline data NK are sequentially stored for each stroke in the rectangular outline data buffer 16 at its respective areas as, for example, shown in the right of FIG. 3.

The routine proceeds to the next decision step 31, and it is determined in decision step 31 whether the recognition dictionary 18 designates the evaluation of a partial structure or not. If a YES is outputted at decision step 31, the routine proceeds from step 31 to step 32. In step 32, the partial structure is evaluated by the partial structure dictionary and in the next decision step 33, it is determined whether or not the evaluated result of the partial structure in step 32 is satisfactory. If a YES is outputted at step 33, then the routine proceeds from step 33 to step 34. In step 34, rectangular outline data GK of the successful partial structure is stored in the buffer 16.

The routine proceeds to the next decision step 35. It is determined in decision step 35 whether or not the next partial structure is evaluated. If a YES is the answer at step 35, then the routine returns from step 35 to step 31, and steps 31, 32, 33, 34 and 35 are repeated.

On the other hand, if a NO is outputted at step 35, the routine proceeds from step 35 to step 36. In step 36, the result of scanning the recognition dictionary 18, i.e., the character code of the recognized result is stored in the output buffer 19. In the next decision step 37, it is determined whether or not the scanning of the recognition dictionary 18 is ended. If a NO is outputted at step 37, the routine returns from step 37 to step 31 and the steps 31, 32, 33, 34, 35, 36 and 37 are repeated. If it is determined that the scanning of the recognition dictionary 18 is ended as represented by a YES at step 37, the routine is ended with step 38. Thus, the character of the recognized result is displayed on a display apparatus (not shown).

If the evaluated result is not satisfactory as represented by a NO at decision step 33, then the routine proceeds from step 33 to step 37.

If the partial structure is not evaluated as represented by a NO at decision step 31, then the routine proceeds from step 31 to the next decision step 41. In decision step 41, it is determined whether or not the directional data between two partial structures is evaluated. If a YES is outputted at step 41, then the routine proceeds from step 41 to step 42. In step 42, the directional relation between the rectangular outline data GK stored in step 34 of the rectangular outline data GK and NK stored in the rectangular outline data buffer 16 and rectangular outline data NK forming the pair with the former data is determined. In the next decision step 43, it is determined whether or not the result in step 42 is satisfactory. If a YES is outputted at step 43, the routine proceeds from step 43 to step 35. If on the other hand the result is not satisfactory, the routine proceeds from step 43 to step 37.

Further, if it is determined in decision step 41 that the evaluation is not the directional relation between two partial structures, the routine proceeds from step 41 to step 51. In step 51, the evaluation is performed by another method and in the next decision step 52, the evaluated result is checked. Such other methods refer to known character recognition procedures which do not require partial structure recognition and the recognition of directional relations between the data #m and #n.

If the evaluated result is satisfactory as represented by a YES at step 52, then the routine proceeds from step 52 to step 35. Whereas, if a NO is outputted at step 52, the routine proceeds from step 52 to step 37.

As described above, according to the present invention, hand-written characters can be recognized. In particular, according to the present invention, the partial structure thus evaluated and the partial structure which is not yet evaluated are obtained and the directional relation between these two partial structures is evaluated to recognize the input hand-written character so that, although the stroke orders within the partial structures are not the same, the partial structures can be stably evaluated and the recognition speed can be increased. Also, interference between characters can be reduced and therefore, the recognition ratio can be increased.

Having described a preferred embodiment of the invention with reference to the accompanying drawings, it is to be understood that the invention is not limited to that precise embodiment and that various changes and modifications thereof may be effected by one skilled in the art without departing from the spirit or scope of the novel concepts of the invention as defined in the appended claims.

We claim as our invention:

1. A hand-written character recognition apparatus comprising:

input means for generating hand-written stroke data;

means for deriving and storing characteristics of the hand-written stroke data;

buffer means for storing rectangular outline and direction data of the hand-written stroke data;

character dictionary means for storing characteristics of strokes of characters and directional relations of rectangular outline data of characters, including rectangular outline and direction data for partial structures of characters; and character recognition means, including partial structure determining means which determines partial structures of the hand-written stroke data, for determining characters of the hand-written stroke data by comparing characteristics and the directional relations of the rectangular outline data stored in the character dictionary means with respect to the direction data of partial-structures of the hand-written strokes stored in the buffer means.

2. A hand-written character recognition apparatus comprising:

input means for generating hand-written stroke data;

means for deriving and storing characteristics of the hand-written stroke data;

buffer means for storing rectangular outline and direction data of the hand-written stroke data, wherein the rectangular outline data stored in the buffer means includes coordinate data for the vertices and center points of the sides of a hypothetical rectangle surrounding each partial structure represented by the cumulative hand written stroke data;

character dictionary means for storing characteristics of strokes of characters and directional relations of rectangular outline data of characters, including rectangular outline and direction data for partial structures of characters; and character recognition means, including partial structure determining means which determines partial structures of the hand-written stroke data, for determining characters of the hand-written stroke data by comparing characteristics and the directional relations of the rectangular outline data stored in the character dictionary means with respect to the direction data of partial-structures of the hand-written strokes stored in the buffer means.

3. A hand-written character recognition apparatus as recited in claim 2, wherein the rectangular outline data stored in the buffer means includes coordinate data for the vertices and center points of the sides of a hypothetical rectangle surrounding a partial structure represented by the cumulative hand written stroke data minus the last inputted hand written stroke data.

4. A hand-written character recognition method comprising the steps of:

generating hand-written stroke data;

deriving and storing characteristics of the hand-written stroke data;

storing rectangular outline and direction data of the hand-written stroke data;

storing characteristics of strokes of characters and directional relations of rectangular outline data of characters, including rectangular outline and direction data for partial structures of characters; and determining characters of the hand-written stroke data, including determining partial structures of the hand-written stroke data, by comparing characteristics and the directional relations of the stored rectangular outline data with respect to the stored direction data of partial-structures of the hand-written strokes.

* * * * *